United States Patent
Newton et al.

(10) Patent No.: US 6,681,071 B2
(45) Date of Patent: Jan. 20, 2004

(54) DRY CORE INDOOR/OUTDOOR FIBER OPTIC CABLE

(75) Inventors: Wayne M. Newton, Lilburn, GA (US); Mark I. Shmukler, Duluth, GA (US); Charles W. Jackson, Atlanta, GA (US); Carla G. Wilson, Conyers, GA (US); Priya L. Tabaddor, Alpharetta, GA (US); Kelly L. Johnson, Roswell, GA (US)

(73) Assignee: Fitel USA Corp., Norcross, GA (US)

( * ) Notice: Subject to any disclaimer, the term of this patent is extended or adjusted under 35 U.S.C. 154(b) by 71 days.

(21) Appl. No.: 10/146,830

(22) Filed: May 15, 2002

(65) Prior Publication Data
US 2003/0215198 A1 Nov. 20, 2003

(51) Int. Cl.[7] ................................. G02B 6/44
(52) U.S. Cl. ..................................... 385/113
(58) Field of Search ................. 385/100–113

(56) References Cited

U.S. PATENT DOCUMENTS

| | | |
|---|---|---|
| 4,786,137 A * | 11/1988 | Cornelison et al. ......... 385/113 |
| 5,249,248 A | 9/1993 | Arroyo et al. |
| 5,751,879 A | 5/1998 | Graham et al. |
| 6,088,499 A | 7/2000 | Newton et al. |
| 6,173,100 B1 | 1/2001 | Newton et al. |
| 6,178,278 B1 | 1/2001 | Keller et al. |
| 6,205,277 B1 | 3/2001 | Mathis et al. |

* cited by examiner

Primary Examiner—Khiem Nguyen
(74) Attorney, Agent, or Firm—Alston & Bird LLP

(57) ABSTRACT

An indoor/outdoor dry core fiber optic cable or sub-unit that incorporates a plurality of optical fibers surrounded by a buffer material wound helically or in reverse-oscillated lay about a water blocking central strength member at a first tension and a first lay length and a water blocking strength member layer wound helically or in reverse-oscillated lay about the optical fibers at a second tension and a second lay length such that the combination of the buffer material, first tension, first lay length, second tension and second lay length result in an indoor/outdoor dry core optical cable capable of meeting ICEA-696 standards.

20 Claims, 5 Drawing Sheets

DRY CORE INDOOR/OUTDOOR FIBER OPTIC CABLE

BACKGROUND OF THE INVENTION

1. Field of the Invention

The present invention relates to fiber optic cables used for indoor and/or outdoor applications and, in particular, to fiber optic cables having an improved buffer region and with improved performance characteristics.

2. Description of the Related Art

In the wiring of premises, such as apartment and commercial buildings, with fiber optic cables, it is common to use a cabling system in which many cables enter the premises and individual cables are broken out for use in individual stations within the building. Heretofore, it has been known to use a high density breakout cable system for wiring such premises. Typically, the fiber optic cables of such a cable system (known as "breakout cables") are available in spools which can be pulled through the building in a routine manner.

Typically, the prior art breakout cables are constructed with water blocking properties such as by incorporating greases and/or gels between an outer jacket and internally carried fibers of the cables. The greases and/or gels are intended to prevent water from migrating through and about the fibers of the cable if the outer jacket of the cable becomes breached in some manner. Although meeting with a certain degree of success, cables incorporating the prior art greases and gels can be difficult to work with due to the messiness and handling difficulties thereof. For example, the greases and/or gels can tend to leak from the cable, such as during a cable termination process. Additionally, the greases and/or gels are particularly undesirable when exposed to warm temperatures because the warmed greases and/or gels tend to flow more readily within the cable jacket and can tend to drip out of the cable, such as at a cable termination point, thereby potentially soiling or damaging components, including electrical and/or electronic components, found within a cable termination cabinet as well as diminishing the water blocking properties of the cable. Furthermore, many prior art cables incorporate a buffer material surrounding the fibers that are difficult or require specialized tools to strip from the fiber for splicing and termination purposes. Also, as fiber sensitivity continues to increase to accommodate greater bandwidth, prior art buffer material may result in unacceptable attenuation of these fibers when tested under standards for fiber optic indoor/outdoor cable as developed by the Insulated Cable Engineers Association, Inc., for example ICEA-696.

Finally, many prior art cables allow an unacceptable amount of the weight of the cable, and any load applied to the cable such as by wind, snow, and/or ice, to be carried by the optical fibers which may damage destroy or shorten the life of the cable.

Therefore, there is a need to provide improved fiber optic cables that address these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention generally is directed to dry core indoor/outdoor fiber optic cables which do not incorporate greases and/or gels for water blocking and that have an improved buffer region and improved performance characteristics. In a preferred embodiment, the cable incorporates a plurality of sub-units with each of said sub-units being arranged adjacent another of the sub-units so that the plurality of sub-units define an outer periphery. Preferably, each of the sub-units includes a plurality of optical fibers at a first tension and a first lay length that at least partially surround a central strength member, a buffer material surrounding each individual optical fiber, a strength member layer at a second tension and a second lay length, and a sub-unit jacket, with each of the optical fibers being arranged adjacent another of the optical fibers. The sub-unit jacket surrounds the optical fibers, with the strength member layer being disposed between the optical fibers and the sub-unit jacket and the optical fibers disposed between the strength member layer and the central strength member. An outer jacket surrounds the plurality of sub-units, with water blocking tape being disposed between the outer jacket and the outer periphery of the sub-units. The buffer material possesses properties such that the attenuation of the optical fibers is reduced as compared to prior art buffer materials, the cable is able to meet ICEA-696 standards, and the buffer material is easily strippable from the optical fibers for ease of terminations and splices.

In accordance with another aspect of the present invention, the cable incorporates an elongated organizer which possesses a first breaking strength. At least one water blocking yarn member is arranged about the organizer and a plurality of sub-units are arranged in reverse-oscillated lay about the organizer so that the water blocking yarn member is disposed between the organizer and the plurality of sub-units. Preferably, each of said sub-units include a plurality of optical fibers at a first tension and a first lay length, a buffer material surrounding each individual optical fiber, a strength member layer at a second tension and a second lay length, and a sub-unit jacket. The strength member layer possesses a second breaking strength, each of the optical fibers possess a third breaking strength, with the first breaking strength being greater than the second breaking strength and the second breaking strength being greater than the third breaking strength. The buffer material possesses properties such that the attenuation of the optical fibers is reduced as compared to prior art buffer materials, the cable is able to meet ICEA-696 standards, and the buffer material is easily strippable from the optical fibers for ease of terminations and splices.

In accordance with yet another aspect of the present invention, an alternative embodiment of the cable includes a plurality of optical fibers, a buffer material surrounding each individual optical fiber with the buffered optical fibers having a first tension and a first lay length that at least partially surround a central strength member, a strength member layer having a second tension and a second lay length, and an outer jacket, with each of the optical fibers being arranged adjacent another of the optical fibers. The outer jacket surrounds the optical fibers, with the strength member layer being disposed between the optical fibers and the outer jacket and the buffered optical fibers disposed between the strength member layer and the central strength member. The strength member layer possesses a first breaking strength, each of the buffered optical fibers possess a second breaking strength, with the first breaking strength being greater than the second breaking strength. The buffer material possesses properties such that the attenuation of the optical fibers is reduced as compared to prior art buffer materials, the cable is able to meet ICEA-696 standards, and the buffer material is easily strippable from the optical fibers for ease of terminations and splices.

In accordance with yet another aspect of the present invention, an alternative embodiment of an indoor/outdoor dry core fiber optic cable assembly includes a plurality of optical fibers, a buffer material surrounding each of the individual optical fibers and the buffered optical fibers having a first tension and a first lay length that at least partially surround a central strength member, a strength member layer having a second tension and a second lay length, and an outer cover, with each of the optical fibers being arranged adjacent another of the optical fibers. The outer cover surrounds the optical fibers and may be a sub-unit jacket or an outer jacket, with the strength member layer being disposed between the optical fibers and the outer cover and the optical fibers disposed between the strength member layer and the central strength member. The strength member layer possesses a first breaking strength, each of the buffered optical fibers possess a second breaking strength, with the first breaking strength being greater than the second breaking strength. The buffer material possesses properties such that the attenuation of the optical fibers is reduced as compared to prior art buffer materials, the cable is able to meet ICEA-696 standards, and the buffer material is easily strippable from the optical fibers for ease of terminations and splices.

The numerous features and advantages of the present invention will be more readily apparent from the following detailed description read in conjunction with the accompanying drawings.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements.

Figure 1A:
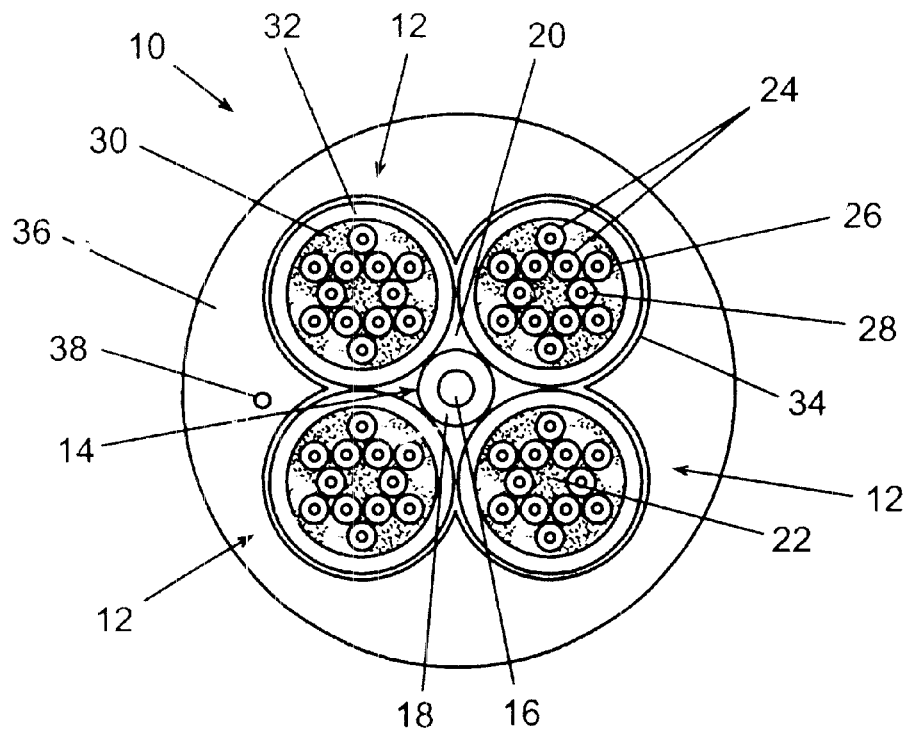
FIG. 1A is a cross-sectional end view of an embodiment of the present invention showing four sub-units and twelve buffered optical fibers in each sub-unit.
Figure 1B:
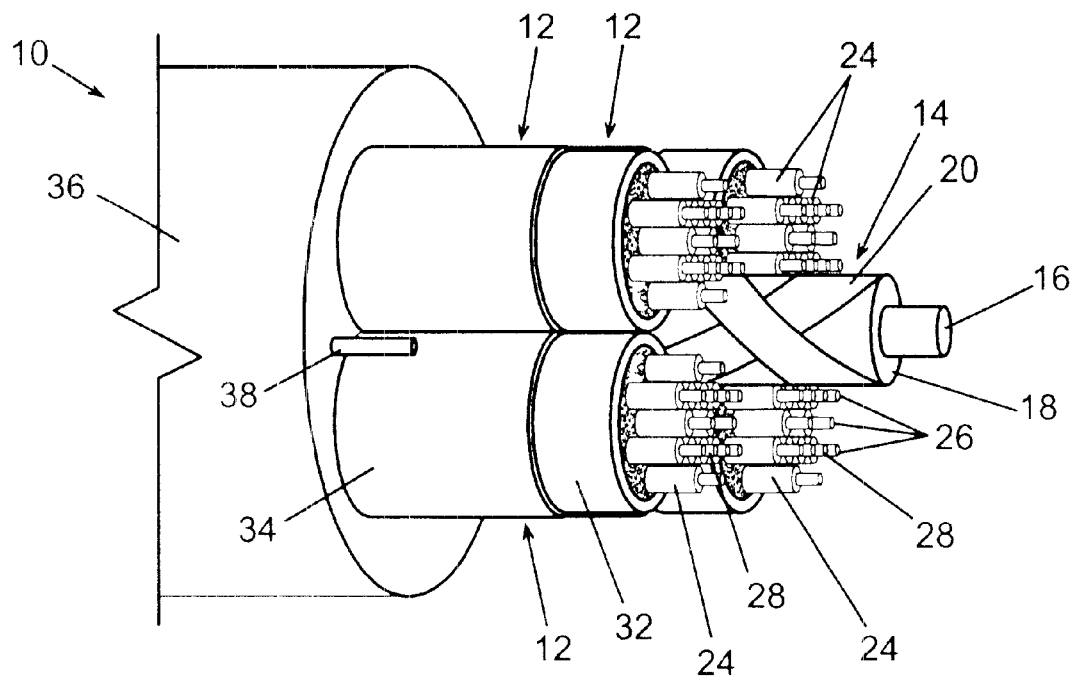
FIG. 1B is a partially cut-away perspective view of the embodiment of FIG. 1A.

Reference will now be made in detail to the description of the invention as illustrated in the drawings, wherein like reference numbers indicate like parts throughout the several views. As shown in FIGS. 1A–1B, an embodiment of the dry core cable 10 in accordance with the present invention incorporates a plurality of component cables or sub-units 12 (the term "dry core," as used herein, is defined as a cable configuration which does not incorporate greases and/or gels to promote water blocking of the cable, as is common in the prior art). In the embodiment of FIGS. 1A–1B, for example, four sub-units 12 cooperate to surround an organizer 14, which is flexible to allow the cable 10 to be flexed, such as for winding the cable onto or off of a drum, or for bending the cable along curves in a desired installation path, etc. Preferably, sub-units 12 are helically wound, or wound with a reverse-oscillated lay, about the organizer. Organizer 14, however, preferably incorporates a breaking strength which is greater than that of the sub-unit's 12 strength members and optical fibers (described in detail hereinafter), and is sufficiently resilient to prevent overbending of the cable, thereby potentially preventing damage to the optical fibers. Organizer 14 also provides strength to relieve sub-units 12 from stresses due to longitudinal compression of the cable, thus further protecting the optical fibers. Another function of the organizer 14 is mechanical spacing for the sub-units 12 so that the sub-units 12 are uniformly spaced and equally loaded in the lateral plane. Organizer 14 includes an inner rod 16 and an outer layer 18, with the rod being formed of a material such as fiberglass and layer 18 being formed of a plastic, such as polyvinyl chloride (PVC), for example. Preferably, rod 16 has a diameter of approximately 0.040 inches, and layer 18 has a radial thickness of approximately 0.023 inches for cables with four or fewer sub-units 12 and layer 18 has a radial thickness of approximately 0.085 inches for cables with five or more sub-units 12. For example, the rod 16 may be 0.040 inch diameter Eglass Rod TM as manufactured by Air Logistics, Inc., and the layer 18 may be Geon W780N TM as manufactured by Geon Corporation, among others, although the dimensions of the rod and layer can vary depending on the particular application.

In the embodiment of FIGS. 1A–1B, organizer 14 is wrapped with water blocking yarn member 20, such as water swellable polyester yarn manufactured by Fiber-Line, Inc., for example. Preferably, yarn member 20 includes two coextensive lengths of water blocking yarn 20 which are helically wound around the organizer. A plurality of sub-units 12 surround yarn member 20, with the yarn filling the spaces formed between the sub-units and the organizer. So configured, yarn member 20 provides an inner layer of water blocking protection to the cable 10.

Each sub-unit 12 includes a central water blocking strength member 22 which is preferably composed of a plurality of aramid yarn strands, such as, for example, six strands of Twaron Type 1052/2420 dTex TM as manufactured by Twaron Products, Inc., although a central strength member of other numbers of yarn strands, denier or composition types can be used such as, for example, Kevlar TM 2180 denier with W/B Coating as manufactured by DuPont Corporation, or water blocking glass roving strands as manufactured by Owens Corning Corporation, among others. In the embodiment of FIGS. 1A–1B, twelve buffered optical fibers 24 surround central strength member 22, with each buffered optical fiber 24 including an optical fiber 26 surrounded by a buffer layer 28, although fewer or more buffered fibers 24 may be used. The optical fibers 26 may be single mode or multimode such as, for example, single mode depressed clad, single mode matched clad, LaserWave TM (50/125 mm), and multimode (62.5/125 mm), among others.

The buffer layer 28 preferably is formed of one or more layers of plastic material that has a modulus of elasticity between 2000 and 6000 mega-Pascals ("MPa") at a temperature of −40 degrees Celsius ("C.") and a modulus of elasticity between 100 and 700 MPa at a temperature of 25 degrees C., or plastic material that has an unrestrained shrinkage between 0.67% and 1.3% when cooled from 25 C. to −40 C. The modulus of elasticity is defined as the normal stress divided by the strain. Physically, it represents the stiffness of the imposed material to the load. These characteristics may be found in plastic materials such as nylon (nylon 12), polypropylene or PVC such as, for example, Apex 910 FOB TM as manufactured by Teknor Apex Co., AG 1011E LCF TM or AG 8570 LCF TM, both as manufactured by AlphaGary Corp., among others. In preferred sizes, the diameter of each buffered optical fiber 24 is 0.035 inches to comply with U.S. standards, or is 0.020 inches to comply with standards in other countries, such as Japan. Of course, other sizes of the buffered optical fibers 24 can be used. Preferably, buffered optical fibers 24 are helically wound, or wound with a reverse-oscillated lay, about the central strength member 22. The winding of the buffered optical fibers 24, either helically or in reverse-oscillated lay, about the central strength member 22 ensures that no one buffered optical fiber is subjected to extreme amounts of tension or compression which could damage the optical fibers when the sub-unit is bent or flexed.

A water blocking strength member layer 30 is wrapped about the buffered optical fibers 24. Preferably, strength member layer 30 is composed of aramid yarn strands such as, for example, 16 strands of Twaron Type 1052/2420 dTex TM as manufactured by Twaron Products, Inc., or 2180 denier Kevlar TM as manufactured by DuPont Corporation, or water blocking glass roving as manufactured by Owens Corning Corporation, among others, although other numbers of aramid yarn strands, denier or composition types of yarn may be used. Preferably, strength member layer 30 is helically wound, or wound with a reverse-oscillated lay, about the buffered optical fibers 24. The lay length of the strength member layer 30 is preferably greater than the lay length of the buffered optical fibers 24. Lay length, in this context, is defined as the axial length of the fiber optic cable required for either the strength member layer 30 or the buffered optical fibers 24 that are helically wound or wound with a reverse-oscillated lay to complete a complete revolution (360 degrees) around the central strength member 22. It is a measurement of the "curliness" of the strength member layer 30 and the buffered optical fibers 24; therefore, if the strength member layer 30 has a longer lay length as compared to the buffered optical fibers 24, it has a shorter overall length because it is less "curly." Likewise, if the buffered optical fibers 24 have a shorter overall lay length as compared to the strength member layer 30, they have a longer overall length because they are more "curly." In this embodiment, for example, the lay length of the strength member layer 30 is between eight and twelve inches, preferably twelve inches; the lay length of the buffered optical fibers is also between eight and twelve inches, preferably eight inches. Having the lay length of the strength member layer 30 longer than the lay length of the buffered optical fibers 24 reduces the stress seen by the buffered optical fibers 24 because a greater amount of the weight of the cable 10 and load imposed on the cable is carried by the strength member layer 30.

Tension is applied to the central strength member 22, the buffered optical fibers 24, and the strength member layer 30 during the manufacture of the sub-unit 12. The amount of tension of these components will affect the performance characteristics of the sub-unit 12 when tested under ICEA-696 standards. Preferably, the central strength member 22 and the strength member layer 30 will have a tension between 170 and 210 grams such as, for example, 200 grams. The buffered optical fibers 24 preferably have a tension between 140 and 180 grams such as, for example, 150 grams.

The optical fibers are held together and protected by a sub-unit jacket 32 formed of plastic material, such as, for example, PolyOne W780N TM as manufactured by PolyOne Canada, Corp., or DFDA-1638 TM as manufactured by Union Carbide Corporation, among others. Preferably the sub-unit jacket is tube-like in shape incorporating a radial thickness of approximately 0.032 inches. So configured, the buffered optical fibers 24 are cushioned on one side by central strength member 22, and cushioned on a side opposite to central strength member 22 by strength member layer 30. This configuration allows for some freedom of movement of the buffered optical fibers 24 to accommodate, for example, flexing of the sub-unit.

Sub-units 12 are wrapped about their outer periphery by a water blocking tape 34, such as, for example, laminated water blocking non-woven polyester tape, manufactured by Lantor, Inc., or water blocking and flame retardant tape manufactured by Geca-Tapes, Inc., among others, thus providing an additional layer of water blocking protection to the cable. An outer jacket 36, formed of plastic material, such as, for example, DFDA-1638 TM as manufactured by Union Carbide Corporation or Geon 786-PVC TM as manufactured by Geon Corporation, among others, engages the exterior surface of tape 34, thereby holding together and protecting sub-units 12 and organizer 14. In the embodiment of FIGS. 1A–1B, outer jacket 36 is approximately 0.125 inches thick at its thickest point and approximately 0.050 inches thick at its thinnest point. Outer jacket 36 also incorporates a ripcord 38 such as, for example, 1500 denier 3-ply aramid rip cord as manufactured by Yarnex, Inc., among others, which is used for tearing the outer jacket so that the sub-units 12 can be separated from each other and from the organizer, such as, for example, during a cable termination process.

Figure 2A:
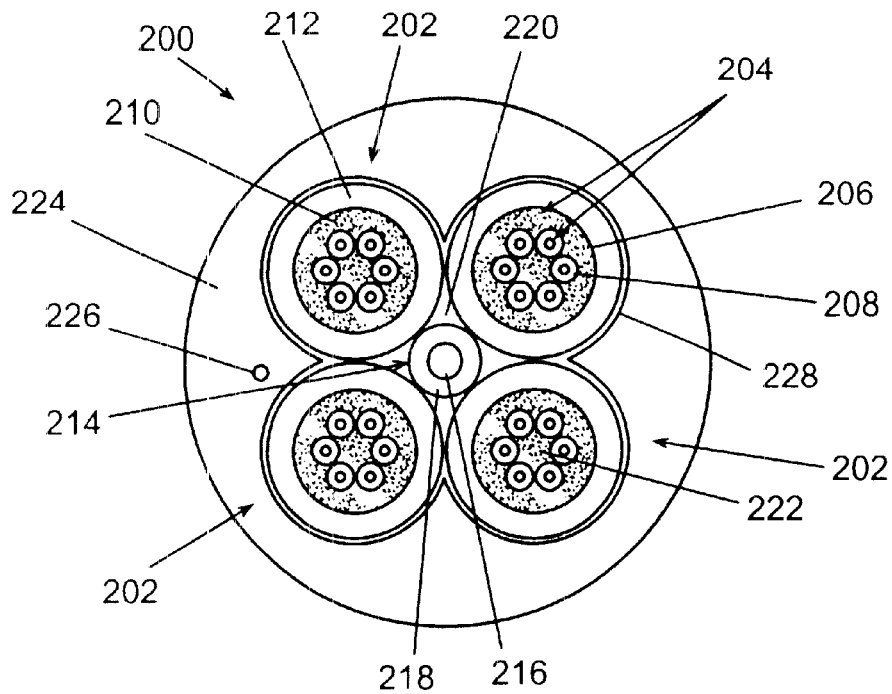
FIG. 2A is a cross-sectional end view of an embodiment of the present invention showing four sub-units and six buffered optical fibers in each sub-unit.
Figure 2B:
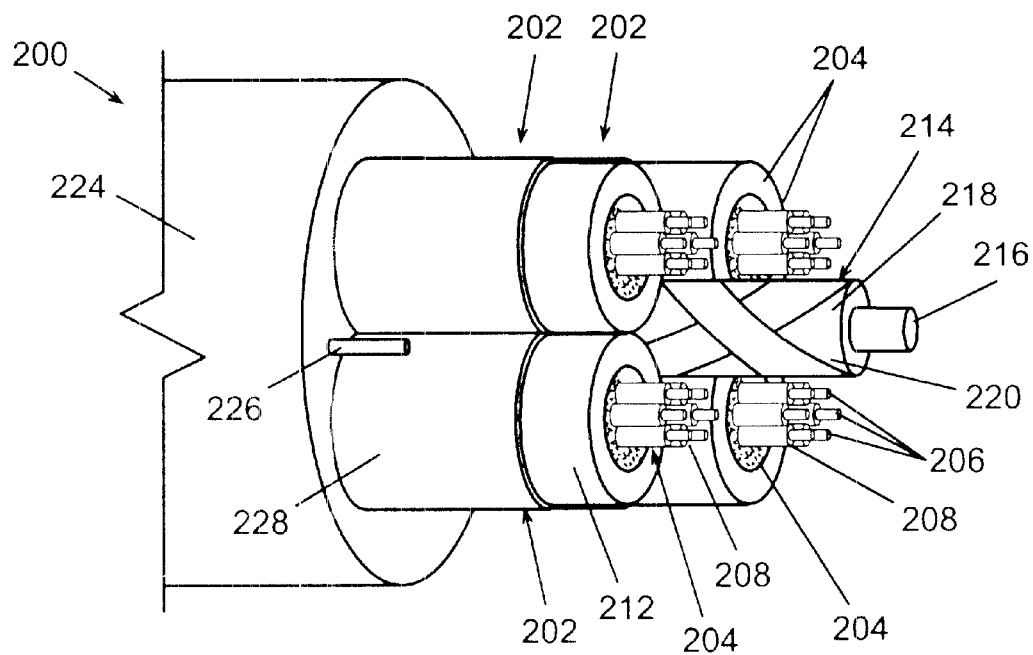
FIG. 2B is a partially cut-away perspective view of the embodiment of FIG. 2A.

As shown in FIGS. 2A–2B is cable 200, which is an alternative embodiment of the cable 10 shown in FIGS. 1A–1B. The alternative embodiment of FIGS. 2A–2B incorporates a plurality of sub-units 202 with six buffered optical fibers 204 in each sub-unit 202, as compared to the embodiment shown in FIGS. 1A–1B which incorporates twelve buffered optical fibers 24 in each sub-unit 12. Otherwise, the corresponding elements of cable 200 are substantially the same as those of cable 10 described above, as are the inventive features and functions.

Figure 3A:
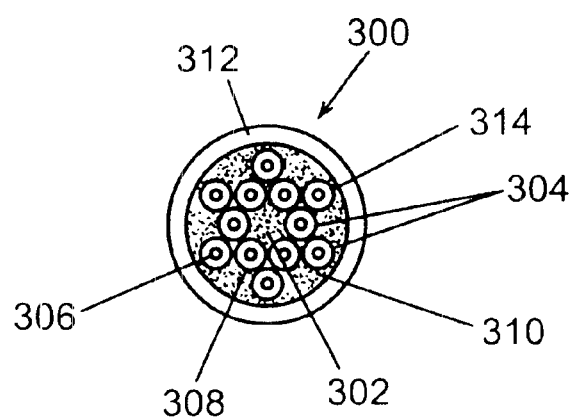
FIG. 3A is a cross-sectional end view of an embodiment of the present invention showing a single unit and twelve buffered optical fibers in the unit.
Figure 3B:
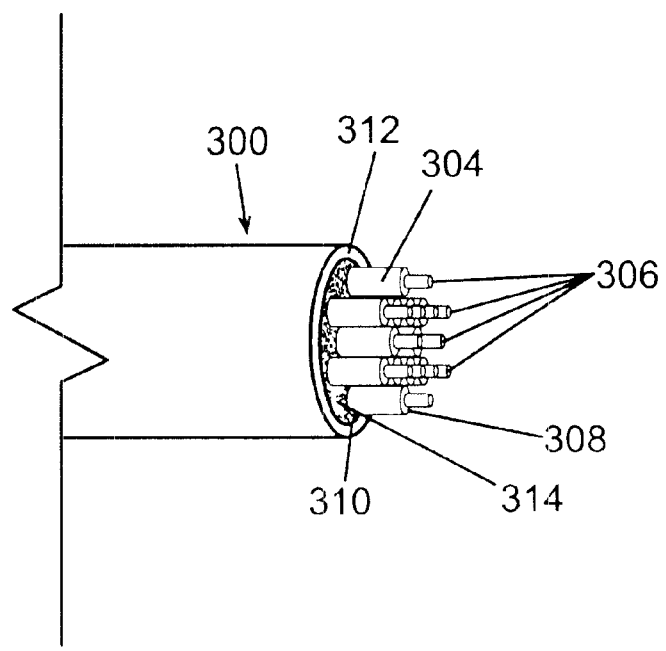
FIG. 3B is a partially cut-away perspective view of the embodiment of FIG. 3A.

As shown in FIGS. 3A–3B, another embodiment of the present invention is dry core fiber optic cable 300, which incorporates a plurality of buffered optical fibers 304 that surround a central water blocking strength member 302 which is preferably composed of a plurality of aramid yarn strands such as, for example, six strands of Twaron Type 1052/1610 dTex TM as manufactured by Twaron Products, Inc., although a central strength member 302 of other numbers of yarn strands, denier or composition types can be used such as, for example, Kevlar TM 1420 denier with W/B Coating as manufactured by DuPont Corporation or Twaron Type 2202/1680 dTex TM as manufactured by Twaron Products, Inc. or water blocking glass roving as manufactured by Owens Corning Corporation, among others. Each buffered optical fiber 304 includes an optical fiber 306 surrounded by a buffer layer 308. The optical fibers 306 may be single mode or multimode such as, for example, single mode depressed clad, single mode matched clad, LaserWave TM (50/125 mm), or multimode (62.5/125 mm), among others.

The buffer layer 308 preferably is formed of one or more layers of plastic material that have a modulus of elasticity between 2000 and 6000 MPa at a temperature of –40 degrees C. and a modulus of elasticity between 100 and 700 MPa at a temperature of 25 degrees C., or plastic material that has and unrestrained shrinkage between 0.67% and 1.3% when cooled from 25 C. to –40 C., or plastic material that exhibits all of the aforementioned characteristics. Such characteristics may be found in plastic materials such as nylon (nylon 12), polypropylene or PVC such as, for example, Apex 910 FOB TM as manufactured by Teknor Apex Co., AG 1011E LCF TM or AG 8570 LCF TM, both as manufactured by AlphaGary Corp., among others. In preferred sizes, the diameter of each buffered optical fiber 304 is 0.035 inches to comply with U.S. standards, or is 0.020 inches to comply with standards in other countries, such as Japan. Of course, other sizes of the buffered optical fibers 304 can be used. Preferably, buffered fibers 304 are helically wound, or wound with a reverse-oscillated lay, about the central strength member 302. The winding of the buffered optical fibers 304, either helically or in reverse-oscillated lay, about the central strength member 302 ensures that no one buffered optical fiber 304 is subjected to extreme amounts of tension or compression which could damage the optical fibers 306 when the cable 300 is bent or flexed.

A water blocking strength member layer 310 is wrapped about the buffered optical fibers 304. Preferably, strength member layer 310 is composed of aramid yarn strands such as, for example, 16 strands of Twaron Type 1052/1610 dTex TM as manufactured by Twaron Products, Inc., 1420 denier Kevlar TM as manufactured by DuPont Corporation, or Twaron Type 2202/1680 dTex TM as manufactured by Twaron Products, Inc., or water blocking glass roving as manufactured by Owens Corning Corporation, among others, although other numbers of aramid yarn strands, denier or composition types of yarn may be used. Preferably, strength member layer 310 is helically wound, or wound with a reverse-oscillated lay, about the buffered optical fibers 304. The lay length of the strength member layer 310 is preferably greater than the lay length of the buffered optical fibers 304. In this embodiment, for example, the lay length of the strength member layer 310 is between eight and twelve inches, preferably twelve inches; the lay length of the buffered optical fibers 304 is also between eight and twelve inches, preferably eight inches.

Tension is applied to the central strength member 302, the buffered optical fibers 304, and the strength member layer 310 during the manufacture of the cable 300. The amount of tension of these components will affect the performance characteristics of the cable 300 when tested to ICEA-696 standards. Preferably, the central strength member 302 and the strength member layer 310 will have a tension between 170 and 210 grams such as, for example, 200 grams. The buffered optical fibers 304 preferably have a tension between 140 and 180 grams such as, for example, 150 grams.

The buffered optical fibers 304, central strength member 302, and strength member layer 310 are held together and protected by an outer jacket 312 formed of plastic material, such as, for example, DFDA-1638 TM as manufactured by Union Carbide Corporation or Geon 786-PVC TM as manufactured by Geon Corporation, among others. In another embodiment, the buffered optical fibers 304, central strength member 302, and strength member layer 310 may be wrapped about their outer periphery by a water blocking tape 314, such as, for example, laminated water blocking non-woven polyester tape, manufactured by Lantor, Inc., or water blocking and flame retardant tape manufactured by Geca-Tapes, Inc., among others, thus providing an additional layer of water blocking protection to the cable 300. The outer jacket 312 will then be applied over the water blocking tape 314. In the embodiment of FIGS. 3A–3B, outer jacket 312 has an inside diameter from 0.177 to 0.187 inches such as, for example, approximately 0.182 inches and an outside diameter from 0.230 to 0.250 inches such as, for example, approximately 0.245 inches. So configured, the buffered optical fibers 304 are cushioned on one side by central strength member 302, and cushioned on a side opposite to central strength member 302 by strength member layer 310. This configuration allows for some freedom of movement of the buffered optical fibers 304 to accommodate, for example, flexing of the cable 300.

Although the embodiment of FIGS. 3A–3B shows twelve buffered optical fibers 304 in the cable 300, the cable 300 may be made with more or fewer buffered optical fibers 304.

Figure 4A:
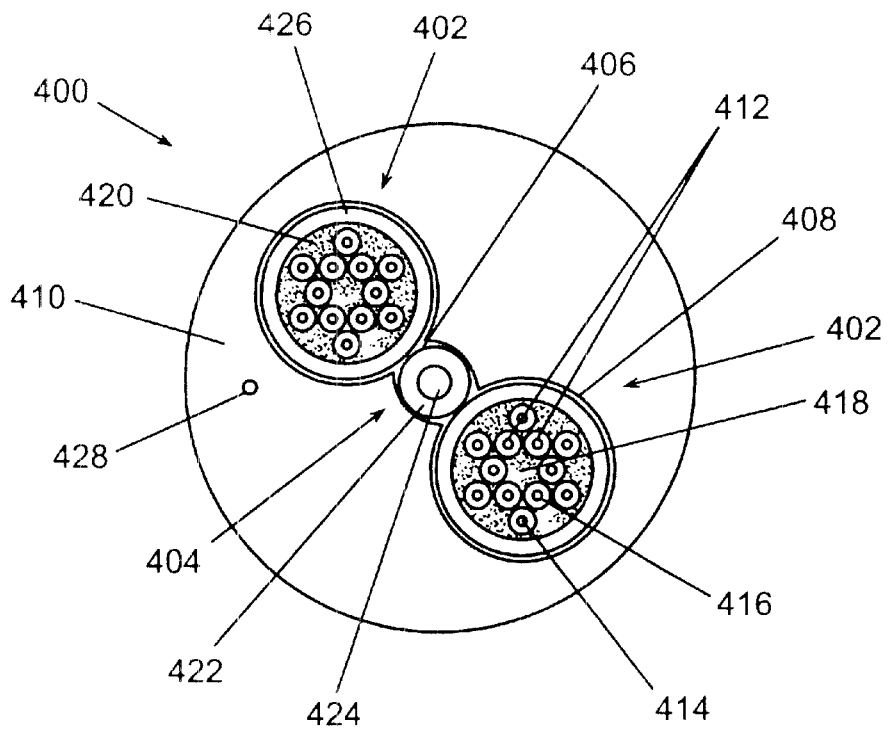
FIG. 4A is a cross-sectional end view of an embodiment of the present invention showing two sub-units and twelve buffered optical fibers in each sub-unit.
Figure 4B:
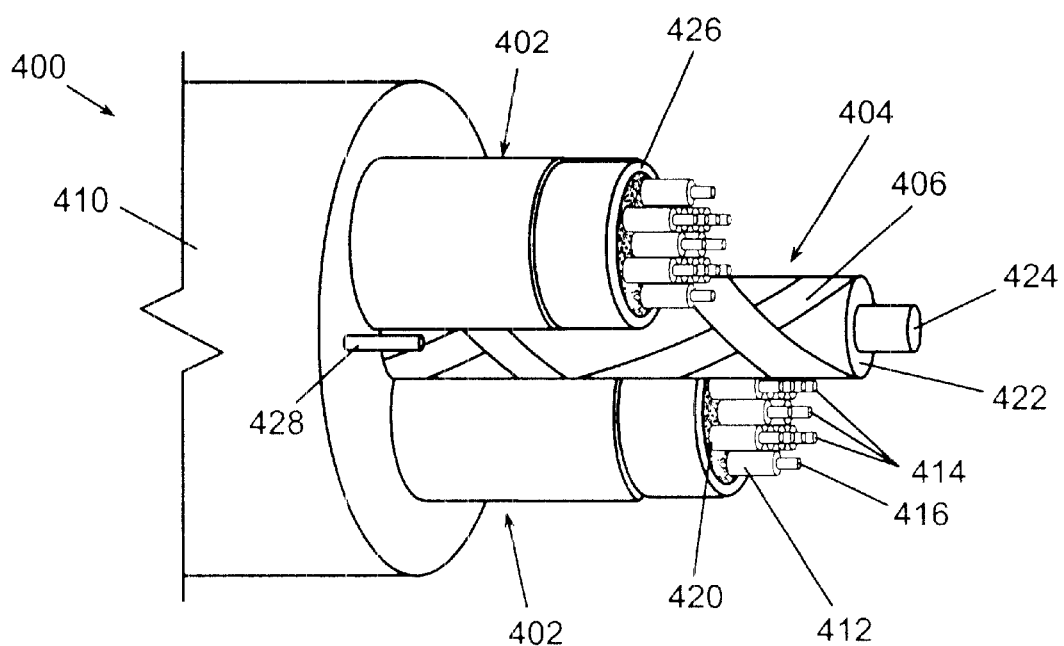
FIG. 4B is a partially cut-away perspective view of the embodiment of FIG. 4A.

As shown in FIGS. 4A–4B, an alternative embodiment of the present invention is cable 400, that incorporates two sub-units 402 surrounding an organizer 404. As described hereinbefore, the organizer is wrapped with yarn member 406 which is arranged to fill any spaces formed between the organizer 404 and the sub-units 402. The sub-units 402 are preferably wound about the organizer 404 in either a helical or a reverse-oscillated lay. Also as described hereinbefore, organizer 404 is wrapped with water blocking yarn member 406. Preferably, organizer 404 includes two coextensive lengths of water blocking yarn 406 which are helically wound around the organizer 404. The sub-units 402 surround yarn member 406, with the yarn filling the spaces formed between the sub-units 402 and the organizer 404. So configured, yarn member 406 provides an inner layer of water blocking protection to the cable 400. As described in relation to the embodiment of FIGS. 1A–1B, the embodiment of FIGS. 4A–4B also incorporates water blocking tape 408 which is wrapped about the outer periphery of the sub-units 402, with the sub-units 402 and their surrounding tape 408 being encased by an outer jacket 410. So configured, cable 400 (FIGS. 4A–4B) provides an optical fiber count of 24 as compared to an optical fiber count of 48 as in the aforementioned four sub-unit 402 embodiment (FIGS. 1A–1B). Otherwise, the corresponding elements of cable 400 are substantially the same as those of cable 10 described above, as are the inventive features and functions.

Figure 5A:
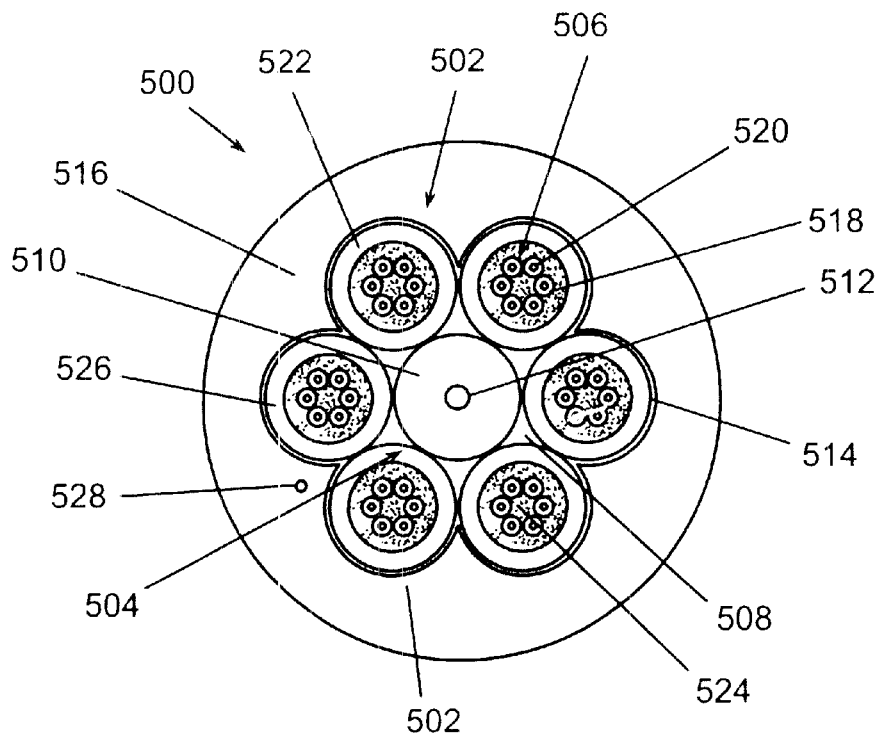
FIG. 5A is a cross-sectional end view of an embodiment of the present invention showing six sub-units and six buffered optical fibers in each sub-unit.
Figure 5B:
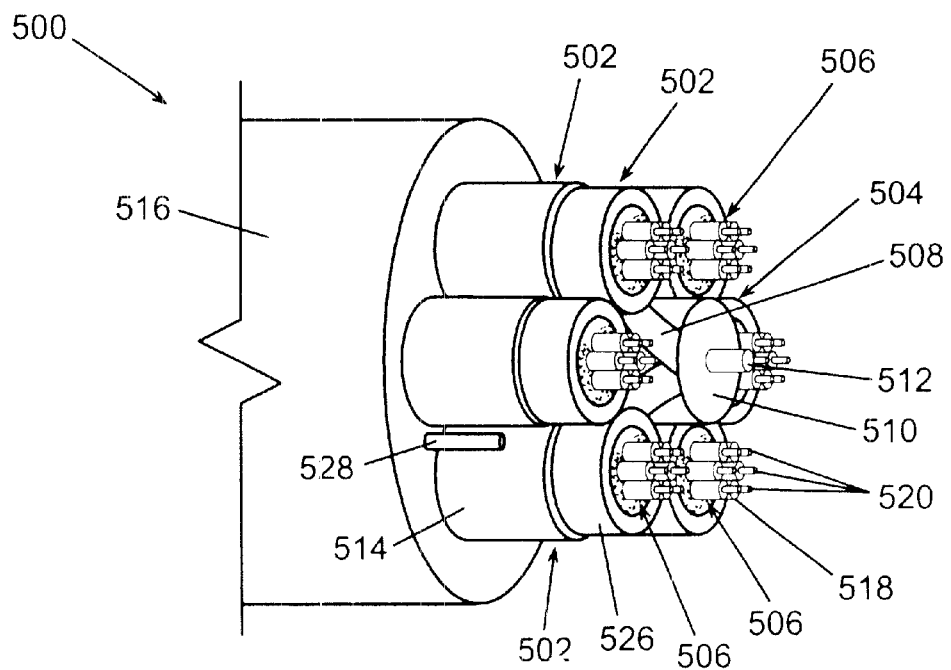
FIG. 5B is a partially cut-away perspective view of the embodiment of FIG. 5A.

As shown in FIGS. 5A–5B, an alternative embodiment of the cable 500 of the present invention is provided which incorporates six sub-units 502 surrounding a organizer 504 with each sub-unit containing six buffered optical fibers 506, although more or fewer sub-units 502 may contain more or fewer buffered optical fibers 506. As described hereinbefore, the organizer 504 is wrapped with yarn member 508 which is arranged to fill any spaces formed between the organizer 504 and the sub-units 502. In the embodiment of FIGS. 5A–5B, however, the organizer 504 is configured with a larger diameter caused by the 0.085 inch thick radial layer 510 about the 0.040 inch diameter rod 512 because of the presence of more than four sub-units 502, with the sub-units 12 preferably being wound about the organizer 504 in a reverse-oscillated lay. Because the organizer 504 and the sub-units 502 are more similar in diameter, each sub-unit 502 is supported by two neighboring sub-units 502 and the organizer 504, thereby providing a uniform and stable cable configuration so that the cable can be exposed to a wide range of temperature variations. As described in relation to the embodiment of FIGS. 1A–1B, the embodiment of FIGS. 5A–5B also incorporates water blocking tape 514 which is wrapped about the outer periphery of the sub-units, with the sub-units 502 and their surrounding tape 514 being encased by an outer jacket 516. So configured, cable 500 (FIGS. 5A–5B) provides an optical fiber count of 36 as compared to a fiber count of 48 as in the aforementioned four sub-unit embodiment (FIGS. 1A–1B). Otherwise, the corresponding elements of cable 500 are substantially the same as those of cable 10 described above, as are the inventive features and functions.

In operation, any embodiment of the cable of the present invention can be used in a manner similar, in part, to the use of conventional fiber optic cables. More specifically, for shipment and storage after manufacture the cable can be wound on a drum or spool. During installation, the cable is unwound from the drum or spool and laid along a desired route. For example, the cable can be inserted and advanced into a communication conduit of a building. The ends of sub-units at each end of the cable or the ends of cable are then coupled to respective communications coupling equipment or other cables, to couple central offices, networks and computer systems, for example. Unlike many prior art cables, however, when installing the cable, the outer jacket of the cable can be stripped without particular care being taken to ensure that the water blocking constituents of the cable, (i.e. greases and/or gels), do not leak or flow from the cable and the buffer material surrounding the optical fibers is easily strippable without specialized tools.

Because the splicing of fiber optic cables required in the prior art is difficult, tedious and time-consuming, the cable of this invention greatly simplifies and reduces the cost of cable installation relative to many prior art cables. Moreover, by eliminating or reducing the number of splicing operations needed to install a fiber optic cable, the cable of this invention reducing the risk of damage to optical fibers necessarily posed by exposure of optical fibers during splicing. Also noteworthy is that, when the organizer is cut, outer layer shields a technician from the cut end of the fiberglass rod. Because this end can be extremely sharp and can potentially cause serious injury to a technician, the organizer of this invention greatly improves the safety of a technician when working with the cable of this invention, relative to many prior art cables.

Sub-units 12 and cable 10, 200, 300, 400, 500 can be manufactured using a conventional system as is well known in the art. During manufacture of the sub-units 12 and cable 10, 200, 300, 400, 500, however, tension is applied to the central strength member, the buffered optical fibers, and the strength member layer. The amount of tension applied to these components during the manufacturing process will affect the performance characteristics of the cable 10, 200, 300, 400, 500 when tested to ICEA-696 standards. Preferably, the central strength member and the strength member layer will have a tension between 170 and 210 grams such as, for example, 200 grams. The buffered optical fibers preferably have a tension between 140 and 180 grams such as, for example, 150 grams.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An indoor/outdoor dry core fiber optic assembly comprising:
    a water blocking central strength member;
    a plurality of optical fibers having a first lay length, a first tension, and being surrounded by a buffer material;
    a water blocking strength member layer having a second lay length and a second tension and at least partially surrounding said optical fibers; and
    an outer cover wherein said outer cover surrounds said optical fibers with said water blocking strength member layer disposed between said optical fibers and said outer cover, wherein said water blocking central strength member is at least partially surrounded by said optical fibers;
    wherein said first lay length is less than said second lay length and said first tension is less than said second tension.

2. The fiber optic assembly of claim 1, wherein the buffer material has an unrestrained shrinkage between 0.67% and 1.3% when cooled from 25 C. to −40 C.

3. The fiber optic assembly of claim 2, wherein said buffer material has a modulus of elasticity between 2000 and 6000 MPa at −40 C. and a modulus of elasticity between 100 and 700 MPa at 25 C.

4. The fiber optic assembly of claim 3, wherein said first tension is less than or equal to 170 grams and said second tension is greater than 170 grams and said first lay length is less than or equal to nine inches and said second lay length is greater than nine inches.

5. An indoor/outdoor dry core fiber optic cable comprising:
    an elongated organizer;
    at least one water blocking yarn member arranged about said organizer;
    a plurality of sub-units arranged about said organizer such that said water blocking yarn member is disposed between said organizer and said plurality of sub-units, each of said sub-units arranged adjacent another of said sub-units, each of said sub-units comprising: a water blocking central strength member, a plurality of optical fibers, a water blocking strength member layer and a sub-unit jacket, each of said optical fibers having a first lay length, having a first tension, each optical fiber being surrounded by a buffer material and being arranged adjacent another of said optical fibers; said water blocking central strength member being at least partially surrounded by said optical fibers, said sub-unit jacket surrounding said optical fibers, said water blocking strength member layer having a second lay length, a second tension and being disposed between said optical fibers and said sub-unit jacket;

an outer jacket surrounding said plurality of sub-units; and water blocking tape surrounding and in contact with said outer periphery of said plurality of sub-units and disposed between said outer jacket and said outer periphery of said plurality of sub-units;

wherein said first lay length is less than said second lay length and said first tension is less than said second tension.

6. The cable of claim 5, wherein the buffer material has an unrestrained shrinkage between 0.67% and 1.3% when cooled from 25 C. to −40 C.

7. The cable of claim 6, wherein said buffer material has a modulus of elasticity between 2000 and 6000 MPa at −40 C. and a modulus of elasticity between 100 and 700 MPa at 25 C.

8. The cable of claim 7, wherein said first tension is less than or equal to 170 grams and said second tension is greater than 170 grams and said first lay length is less than or equal to nine inches and said second lay length is greater than nine inches.

9. The cable of claim 8, wherein said water blocking central strength member comprises water blocking aramid yarn.

10. The cable of claim 8, wherein said water blocking strength member layer comprises water blocking aramid yarn.

11. The cable of claim 5, wherein said organizer comprises a glass rod and an outer layer of plastic formed about said glass rod.

12. The cable of claim 5, wherein said water blocking yarn member is a polyester water swellable yarn.

13. An indoor/outdoor dry core fiber optic cable comprising:

a water blocking central strength member;

a plurality of optical fibers having a first lay length, a first tension, and each optical fiber being surrounded by a buffer material and arranged adjacent another of said optical fibers;

a water blocking strength member layer having a second lay length and a second tension; and an outer jacket such that said outer jacket surrounds said optical fibers with said water blocking strength member layer disposed between said optical fibers and said outer jacket, said water blocking central strength member is at least partially surrounded by said optical fibers;

wherein said first lay length is less than said second lay length and said first tension is less than said second tension.

14. The cable of claim 13, wherein the buffer material has an unrestrained shrinkage between 0.67% and 1.3% when cooled from 25 C. to −40 C.

15. The cable of claim 14, wherein said buffer material has a storage modulus between 2000 and 6000 MPa at −40 C. and a storage modulus between 100 and 700 MPa at 25 C.

16. The cable of claim 15, wherein said first tension is less than or equal to 170 grams and said second tension is greater than 170 grams and said first lay length is less than or equal to nine inches and said second lay length is greater than nine inches.

17. The cable of claim 16, wherein said water blocking strength member layer comprises water blocking aramid yarn.

18. The cable of claim 17, wherein said water blocking central strength member comprises water blocking aramid yarn.

19. A method of fabricating a dry core indoor/outdoor fiber optic assembly comprising the steps of:

providing a water blocking central strength member;

wrapping a plurality of optical fibers about the water blocking central strength member in a reverse-oscillated lay at a first tension and first lay length with said water blocking central strength member at least partially surrounded by said optical fibers, each optical fiber surrounded by a buffer material;

wrapping a water blocking strength member layer about the optical fibers in a reverse-oscillated lay at a second tension and a second lay length; and providing an outer cover about said optical fibers with said water blocking strength member layer disposed between said optical fibers and said outer cover;

wherein said first lay length is less than said second lay length and said first tension is less than said second tension.

20. The method of claim 19, further comprising the steps of:

providing an elongated organizer;

wrapping a water blocking yarn about said organizer;

wrapping a plurality of fiber optic assemblies about said water blocking yarn in a reverse-oscillated lay;

wrapping said plurality of fiber optic assemblies with a water blocking tape; and forming an outer jacket about said plurality of fiber optic assemblies and said water blocking tape such that said water blocking tape is disposed between said plurality of said fiber optic assemblies and said outer jacket.

\* \* \* \* \*